(12) United States Patent
Lee et al.

(10) Patent No.: US 9,104,375 B2
(45) Date of Patent: Aug. 11, 2015

(54) PORTABLE COMPUTER

(71) Applicant: Wistron Corporation, New Taipei (TW)

(72) Inventors: Jia-Hung Lee, New Taipei (TW);
Yung-Shen Chen, New Taipei (TW);
Yen-Shuo Feng, New Taipei (TW)

(73) Assignee: Wistron Corporation, New Taipei (TW)

( * ) Notice: Subject to any disclaimer, the term of this patent is extended or adjusted under 35 U.S.C. 154(b) by 303 days.

(21) Appl. No.: 13/912,022

(22) Filed: Jun. 6, 2013

(65) Prior Publication Data
US 2014/0049891 A1 Feb. 20, 2014

(30) Foreign Application Priority Data

Aug. 20, 2012 (TW) .............................. 101130173 A (51) Int. Cl.
*G06F 1/16* (2006.01)

(52) U.S. Cl.
CPC .............. *G06F 1/1637* (2013.01); *G06F 1/162* (2013.01); *G06F 1/1624* (2013.01); *G06F 1/1662* (2013.01)

(58) Field of Classification Search
CPC ... G06F 1/1616; G06F 1/1656; G06F 1/1664; G06F 1/1666; G06F 1/1667; G06F 3/0202; G06F 3/0213; G06F 3/0216; G06F 3/0221; G06F 1/1618; G06F 1/1626; G06F 1/1628; G06F 1/1622; G06F 1/1641; G06F 1/1645; G06F 1/1649; G06F 1/1654; G06F 1/166; G06F 1/1637; G06F 2200/1633

USPC .......... 361/679.01, 679.02; 455/575.1–575.4; 341/22–33
See application file for complete search history.

(56) References Cited

U.S. PATENT DOCUMENTS

| | | | | |
|---|---|---|---|---|
| 5,659,307 A | * | 8/1997 | Karidis et al. | .................. 341/22 |
| 5,706,167 A | * | 1/1998 | Lee | .......................... 361/679.55 |
| 7,184,263 B1 | | 2/2007 | Maskatia | |

FOREIGN PATENT DOCUMENTS

| | | |
|---|---|---|
| TW | 566583 | 12/2003 |
| TW | 584227 | 4/2004 |

* cited by examiner

*Primary Examiner* — Anthony Haughton
*Assistant Examiner* — Ingrid Wright
(74) *Attorney, Agent, or Firm* — Muncy, Geissler, Olds & Lowe, P.C.

(57) ABSTRACT

A portable computer includes a base, a display module, at least one support element, a sliding assembly, two connecting robs, and a keyboard module. The display module includes a connecting end and a support surface. Each support element includes a first fixed end connected pivotally to the support surface and a second fixed end connected pivotally to the base. The sliding assembly includes a sliding element and a sliding guiding element disposed in the base. The sliding element is combined with the connecting end and sliding along the sliding guiding element. The keyboard module includes two keyboard portions. Each keyboard portion is moveably combined with the base. Each connecting rob can be pushed by the sliding element to drive the two keyboard portions to move relative to the base.

11 Claims, 12 Drawing Sheets

PORTABLE COMPUTER

BACKGROUND OF THE INVENTION

1. Field of the Invention

The invention relates to a portable computer, and more particularly, to a portable computer combined with a detachable keyboard module to facilitate the adjustment of a position of a display screen.

2. Description of the Related Art

Computing devices have become an indispensable part of our daily life. With the fast development of touch technologies, most hand-held devices or electronic devices such as tablet PCs, smart phones, and PDAs now provide touch panels instead of mouse or keyboard as input devices. These devices are equipped with operating systems supporting touch functions to enable intuitive and convenient operation.

The notebook computer, however, is equipped with a QWERTY keyboard and an input device such as a touch pad, and the operating system previously installed on the notebook may not support touch input function or may not be designed for touch in terms of the operation interface design. Therefore, traditionally pure notebooks rarely have touch requirements or touch design. However, operating system vendors have designed operating systems for laptops allowing touch control of the operating system. On the other hand, consumer demand for the touch operation by a tablet computer or smartphone is also growing; therefore, the demand for a notebook that can be transformed into a tablet computer exists. In order to facilitate a display screen to rotate and transform relative to the notebook computer itself, in the prior art, a support arm or linked component has been used to support and pivotally connect the notebook with the display screen, which is operated in coordination with the corresponding sliding assembly such that the position of the display screen can be successfully changed.

For example, a portable computer disclosed in Taiwan Patent No. 1316666 (U.S. Pat. No. 7,184,263B1) employs a plate supporting element to support a display screen and provides guide slots in both sides of a keyboard for the bottom of the display screen to slide relative to the computer body, such that the display screen can be disposed upright. In Taiwan Patent No. 566583, a display screen of a notebook can be flipped relative to a base through the design of a plurality of linkage mechanisms in both sides thereof to change the screen display direction.

However, in view of a structure where a display screen rotates relative to a computer body in the aforementioned conventional design, since the computer body is generally provided with a keyboard module, the corresponding sliding elements disposed within the computer body must be away from the keyboard module to work smoothly without interference. Accordingly, such sliding elements are mostly confined at both sides of the keyboard module and must be a paired symmetrical structure, such that the display screen can be moved in a balanced manner. In such design, components that mostly comprise complex linkage mechanisms for pivoting, linkage, and sliding need to be provided and operated to achieve the flip effect, which is less favorable for the assembly and operation of the notebook. Also, since the mechanism may be too complex and supporting and linkage mechanisms may be exposed at both sides thereof, it is not only visually unattractive, but a user's fingers may be accidentally pinched during slide operations. In addition, the supporting mechanisms at both sides need to be considered and kept in a symmetric steady state while the display screen is sliding and moving, for the uneven force on the two sides may cause it not to slide smoothly due to resistance. Furthermore, once one side is damaged, the display screen cannot be flipped successfully.

Therefore, it is indeed a worthy subject to design a structure of the portable computer that is unobstructed by a keyboard module and to provide a stable slide and flip effect.

SUMMARY OF THE INVENTION

It is a major objective of the present invention to provide a portable computer combined with a detachable keyboard module to facilitate the adjustment of a position of a display screen.

To achieve the aforementioned objective, a portable computer of the present invention includes a base, a display module, at least one support element, a sliding assembly, two connecting rods and a keyboard module. The base includes a front end and a rear end, and a first area is defined on a front side and a second area is defined on a rear side between the front end and the rear end. The display module includes a connecting end and a support surface. Each of the support elements includes a first fixed end and a second fixed end. The first fixed end is pivotally connected to the support surface of the display module for allowing the display module to rotate relative to the support element. The second fixed end is pivotally connected to the rear end or close to the rear end for allowing the support element to rotate relative to the base. The sliding assembly includes a sliding element and a sliding guiding structure. The sliding guiding structure is disposed in the base and the sliding element is combined with the connecting end of the display module and able to slide along the sliding guiding structure. Each of the connecting rods includes a pivot portion, a moving element and a pushing element. Each of the connecting rods is combined with the base and rotated with the pivot portion as a fulcrum. The pivot portion is disposed between the moving element and the pushing element. The keyboard module includes two separable keyboard portions. Each of the keyboard portions is movably combined with the first area of the base, and each of the keyboard portions includes a track. The moving element of each of the connecting rod slides along the track of each of the keyboard portions so as to drive each of the keyboard portions to move relative to the base.

Whereby, when the display module is pushed to move the sliding element connected to the connecting end along the sliding guiding structure from the second area to the first area, the sliding element pushes against the pushing element of the connecting rod so that the connecting rod rotates with the pivot portion as the fulcrum, and drive the moving element to slide along the track so as to push the two keyboard portions to be separate from each other with a gap, which allows the sliding element to enter the first area and to continuously pass through the keyboard module.

By the design of the invention, a user only needs to flip the display module relative to the base to make the connecting end of the display module slide towards the first area or the second area, so that two keyboard portions are separated or combined by the sliding element working with the connecting rod. Accordingly, the display module can be flipped about 180 degrees relative to the base and overlaps the base. The portable computer provides different operation states according to the display module faces the base by the display surface or the support surface.

DETAILED DESCRIPTION OF THE PREFERRED EMBODIMENT

To better explain the aforementioned and other objectives, advantages and features of the invention, following embodiments are provided accompanied with drawings for detailed disclosure.

Figure 1:
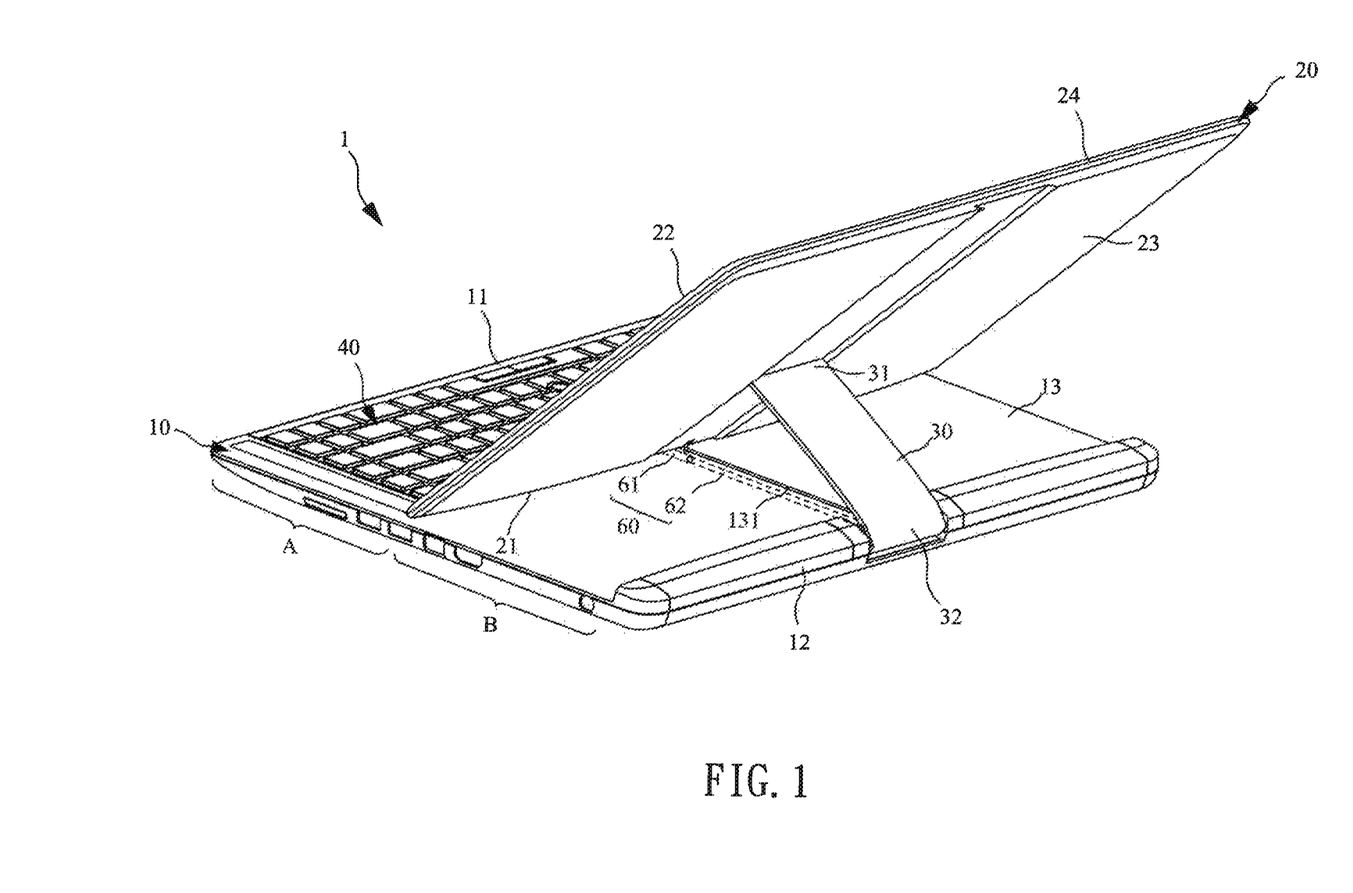
FIG. 1 is a view showing a portable computer of the present invention.
Figure 2:
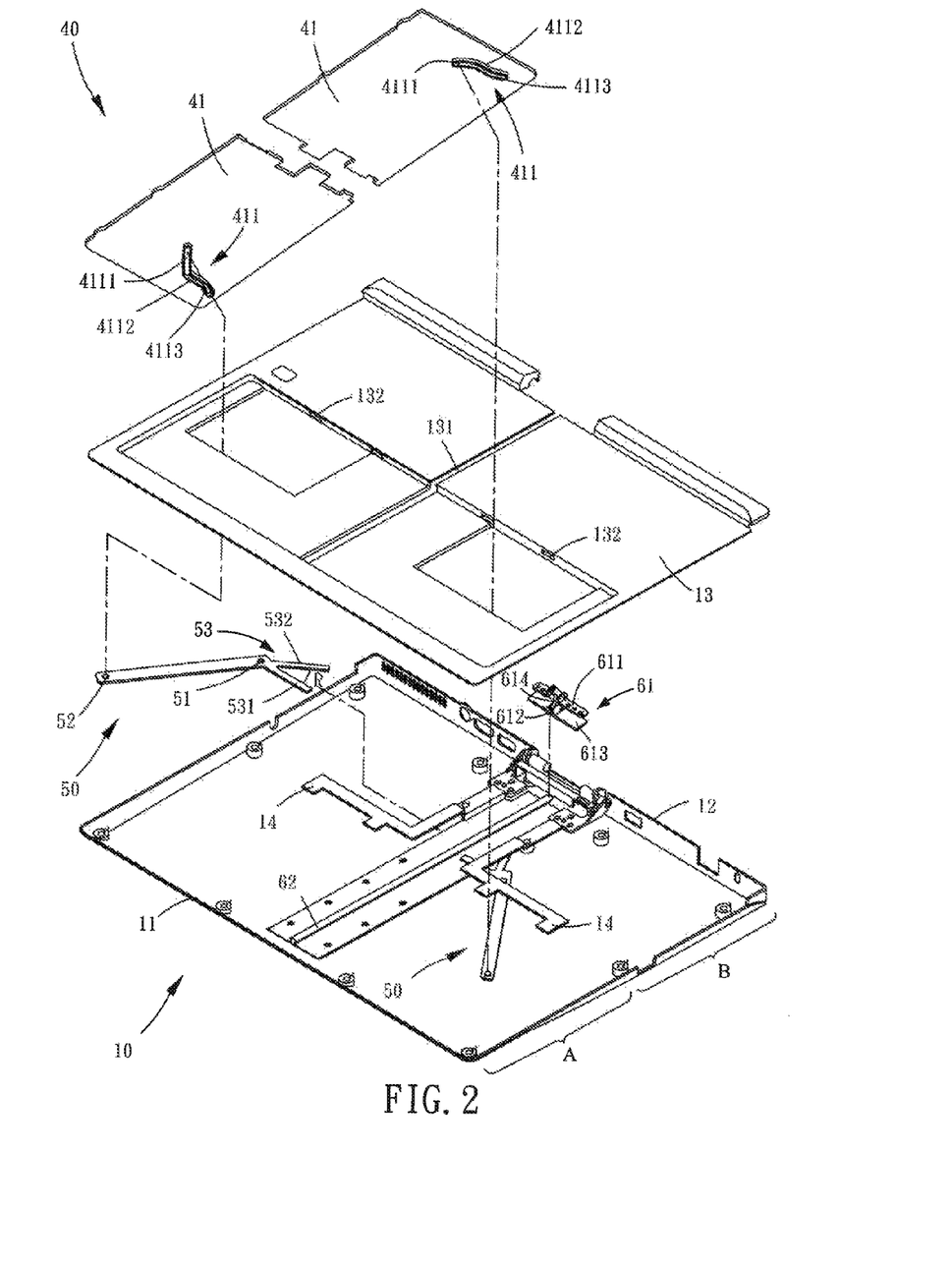
FIG. 2 is an explosive view of the base of the portable computer of the present invention.

Please refer to both FIG. 1 and FIG. 2. FIG. 1 is a view showing a portable computer 1 of the present invention; FIG. 2 is an explosive view of the base 10 of the portable computer 1 of the present invention.

In one embodiment, the portable computer 1 is a notebook computer. However, depending on the type of the application, the portable computer 1 can also be a tablet PC combined with a extended platform, a netbook or other electronic devices with a flip display module, and it is thus not limited to the present embodiment.

As shown in FIG. 1 and FIG. 2, the portable computer 1 includes a base 10, a display module 20, a support element 30, a sliding assembly 60, two connecting rods 50 and a keyboard module 40. Main computing components and related electronic components are disposed at the interior of the base 10. In this embodiment, the base 10 includes a front end 11, a rear end 12, a surface 13 and a plurality of restraint elements 14. A first area A is disposed on a front side and a second area B is disposed on a rear side between the front end 11 and the rear end 12. The surface 13 includes a slit 131 and a plurality of through holes 132. The slit 131 is run through a central portion, or a substantially central portion of the area A and the area B, but the invention is not limited to thereto. The constraint element 14 is able to protrude through the plurality of though holes 132 and provides assisted fixing effect to the keyboard module 40 after the keyboard module 40 is combined with the surface 13 of the first area A.

The display module 20 includes a connecting end 21, a display surface 22, a support surface 23 and a free end 24. The display surface 22 and the support surface 23 are opposite each other, and the connecting end 21 and the free end 24 are opposite each other. Also, a rotatable pivot joint in the central part of the connecting end 21 is formed by enabling a hinge or shaft component to be combined with the sliding element 61 of the sliding assembly 60, such that the display module 20 can rotate relative to the sliding element 61. The display surface 22 of the display module 20 can be provided with a display screen that supports touch control for receiving the user's touch operation.

The support element 30 includes a first fixed end 31 and a second fixed end 32. The first fixed end 31 is pivotally connected to the support surface 23 of the display module 20 by means of, for example, a hinge element, to form a rotatable pivot joint for the display module 20 to rotate relative to the supporting element 30. The second fixed end 32 is also pivotally connected to the rear end 12 of the base 10 by means of, for example, a hinge element, to form another rotatable pivot joint for the supporting element 30 to rotate relative to the base 10. In this embodiment, the design of a single supporting element 30 is adopted, but the number and positions of the supporting elements 30 are not limited to this.

Figure 3:
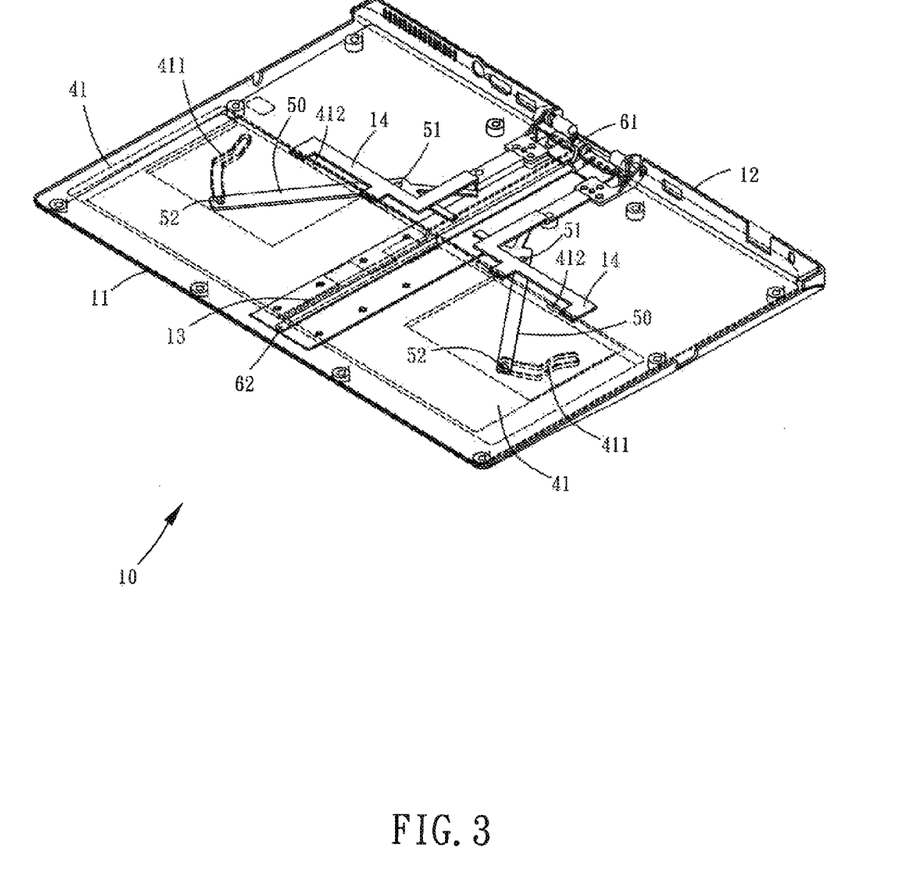
FIG. 3 is a view showing the base of the portable computer of the present invention after being assembled.

Please refer to both FIG. 2 and FIG. 3. FIG. 3 is a view showing the base 10 of the portable computer 1 of the present invention after being assembled. It is noted that in order to clearly illustrate relative structure arrangement of the base 10 and related components, dashed lines in FIG. 3 are used for showing the main body of the keyboard module 40 and the surface of the base 10.

As shown in FIG. 2 and FIG. 3, the sliding assembly 60 includes a sliding element 61 and a sliding guiding structure 62. The sliding guiding structure 62 is steadily disposed at the base 10. The sliding element 61 is connected to the connecting end 21 of the display module 20 to provide the sliding and pivoting function for the display module 20, and can slide relative to the base 10 along the slide corresponding element 62 between the rear end 12 and the front end 11 of the base 10. The sliding guiding structure 62 is disposed within the base 10 in the position corresponding to the slit 15 for the sliding element 61 to pass through the slit 15 and slide between the rear end 12 and the front end 11 of the base 10.

The sliding element 61 includes a pivot portion 611, a connecting portion 614, a sliding portion 612 and two driving elements 613. The sliding element 61 passes through the slit 131 via the connecting portion 614 and is pivotally connected to the connecting end of the display module (now shown, referring to FIG. 1) by the pivot portion 611. The sliding portion 612 is connected to the pivot portion 611 with the connecting portion 614, and the sliding portion 612 is movably combined with the sliding guiding structure 62 so that the sliding element 61 slides along the sliding guiding structure 62. The two driving elements 613 are disposed at two sides of the sliding element 61 with a single lever form. However, the driving elements 613 can be implemented in different forms in other embodiments. For example, each driving element 611 can be implemented in plurality of levers to be disposed apart in the corresponding sides of the sliding element 61.

In this embodiment, the sliding guiding structure 62 is a rod element and the sliding element 61 is a sleeve element. The sliding element 61 is combined to the rod element with wearing or as sleeve to slide along the rod element. However, it is not limited to this. For example, the sliding element 61 and the sliding guiding structure 62 can be replaced with a sliding block cooperated with a sliding track so that the sliding block slides along the sliding track.

Each connecting rod 50 includes a pivot portion 51, a moving element 52 and a pushing element 53. Each connecting rod 50 is rotatably combined with the base 10 with the pivot portion 51 as a fulcrum. The pivot portion 51 is disposed between the moving element 52 and the pushing element 53. It means that each connecting rod 50 is separated with the pivot portion 51 and the moving element 52 and the pushing element 53 are at two ends of the connecting rod 50 respectively. When the pushing element 53 is force applied to rotate with the pivot portion 51 as the fulcrum relative to the base 10, the moving element 52 also rotates with the pivot portion 51 as the fulcrum relative to the base 10. The pushing element 53 includes a first action portion 531 and a second action portion 532. The two connecting rods 50 are combined with the base 10 symmetrically.

In this embodiment, the first action portion 531 and the second action portion 532 use lever structures with same length. The lengths of the first action portion 531 and the second action portion 532 of the pushing element 53 are long enough to be pushed by the driving element 613 of the sliding element 61. A angle R (e.g. 30 degrees or 45 degrees) is formed between the first action portion 531 and the second action portion 532 have so that the pushing element 53 shows as a V-shaped lever structure. In this embodiment, the lengths and of the first action portion 531 and the second action portion 532 and the angle R between the first action portion 531 and the second action portion 532 can be changed according to different designs of the two driving elements 613 of the sliding element 61 and the corresponding keyboard module 40, so that the two driving elements 613 of the sliding element 61 are able to push the pushing element 53 successfully. But, the invention is not limited to this. For example, the first action portion 531 and the second action portion 532 can have different lengths respectively.

The keyboard module 40 is disposed in the first area A of the base 10. The keyboard module 40 includes two separable keyboard portions 41. Each of the keyboard portions 41 is movably combined with the base 10. Each keyboard portion 41 includes a track 411 and a plurality of restraint holes 412. Each track 411 includes a straight track 4112 and two arc tracks 4111 and 4113. A direction of the straight track 4112 is substantially parallel to a sliding direction of the sliding element 61, and the straight track 4112 has two ends respectively connected to the different arc tracks 4111 and 4113. The two arc tracks 4111 and 4113 have track paths corresponding to different circular arcs both with the pivot portion 51 as a center of a circle but with different diameters. The arc tracks 4111 and 4113 are used for buffering when the moving element 52 of the lever 50 is slid into. However, the arc tracks 4111 and 4113 of the invention are not limited to this. For example, the arc track 4113 can be canceled but the arc track 4111 and the straight track 4112 are reserved.

The plurality of restraint holes 412 are disposed correspondingly to the restraint element 14 of the base 10. Each of the keyboard portions 41 is fixed on the surface 13 of the base 10 by the plurality of restraint holes 412 cooperated with the restraint element 14, so that each of the keyboard portions 41 is able to slides laterally relative to the base 10.

In this embodiment, the moving element 52 of each connecting rod 50 slides along the track 411 of each keyboard portion 411 respectively. When the moving element 52 slides along the straight track 4112, the moving element 42 drives the two keyboard portions 41 to move in opposite directions relative to the base 10 and to be separated. Because the two arc tracks 4111 are both circular arcs with the pivot portion 51 as a center of a circle, when the moving element 52 slides along the arc track 4111, each keyboard portion 41 does not move relative to the base 10 and remains fixed.

Figure 4A:
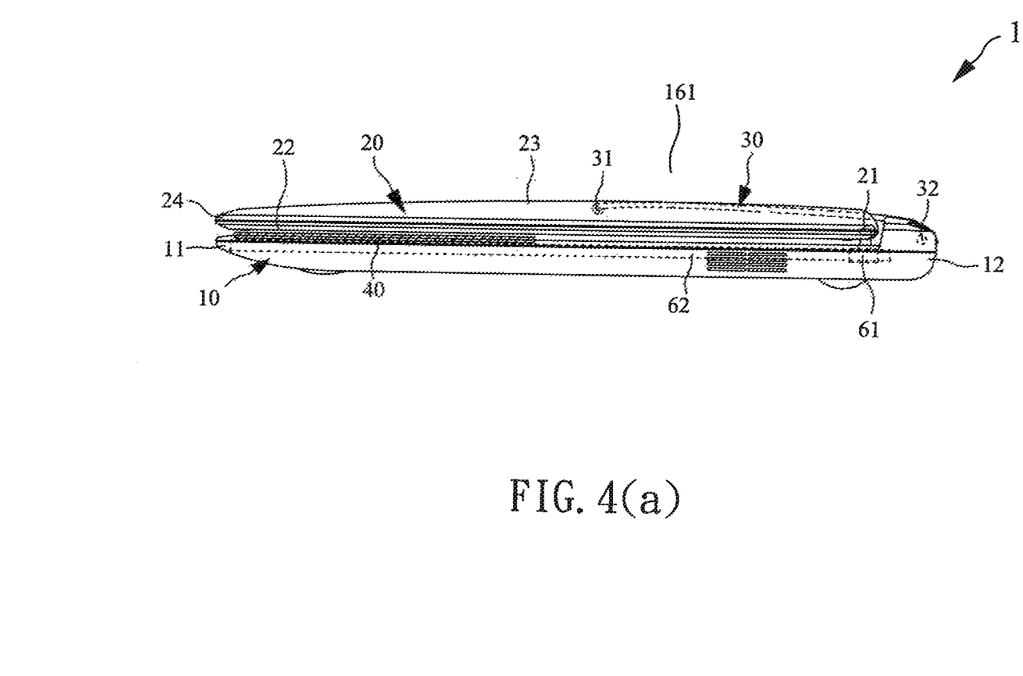
FIG. 4(a) is a view showing the portable computer of the present invention in a closed state.
Figure 4B:
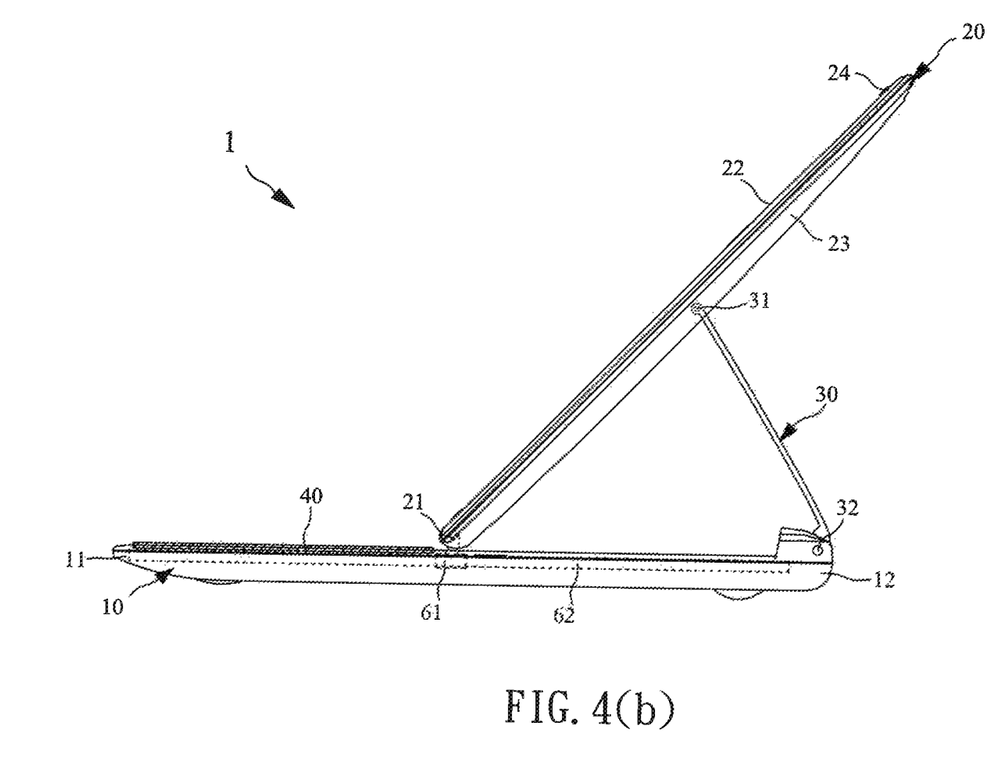
FIG. 4(b) is a view showing the portable computer of the present invention in a normal operation state.
Figure 4C:
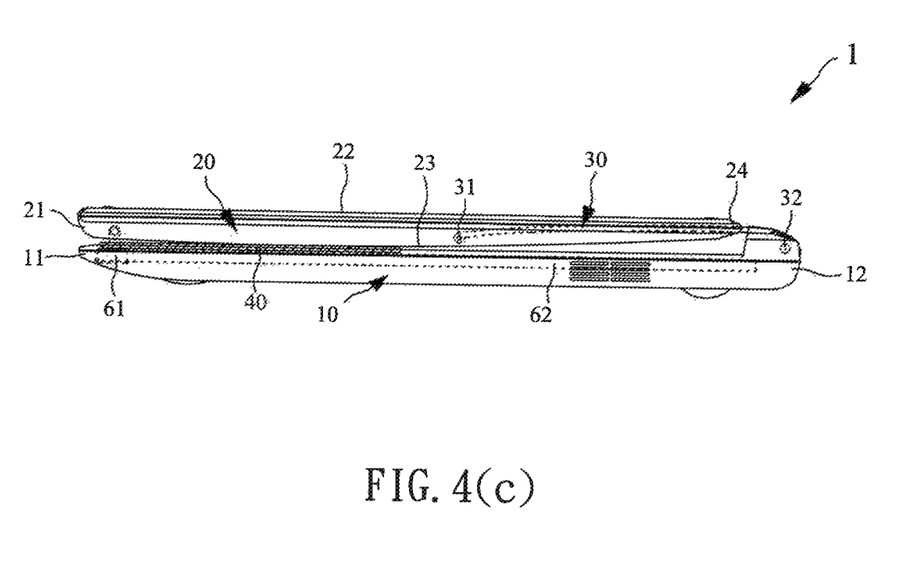
FIG. 4(c) is a view showing the portable computer of the present invention in a tablet operation state.

Please refer to FIGS. 4(a), (b) and (c). FIG. 4(a) is a view showing the portable computer 1 of the present invention in a closed state. FIG. 4(b) is a view showing the portable computer 1 of the present invention in a normal operation state. FIG. 4(c) is a view showing the portable computer 1 of the present invention in a tablet operation state.

As shown in FIG. 4(a), when the portable computer 1 is in a closed state, the display module 20 is superimposed on the base 10 and pivotally connected to the sliding element 61 by means of the connecting end 21. At this time, the display surface 22 of the display module 20 faces to the base 10. The support element 30 is also superimposed on the display module 20 and pivotally connected to the rear end 12 of the base 10 and the display module 20 respectively by means of the first fixed end 31 and the second fixed end 32.

When a user applies force to the free end 24 opposing to the connecting end 21 of the display module 20 to flip the display module 20, in the process of exiting the closed state, the display module 20 rotates with the support element 30 relative to the base 10 using the second fixed end 32 as a fulcrum. After it is rotated and lifted over a certain angle, through the aforementioned design of the supporting element 30, the display module 20 starts to rotate relative to the supporting element 30 using the first fixed end 31 of the supporting element 30 as a fulcrum. Meanwhile, the display module 20 rotates relative to the sliding element 61 using the connecting end 21 as a fulcrum and pushes the sliding element 61 forward, and drives the connecting end 21 of the display module 20 to slide forward towards the front end 11 of the base 10 by the sliding element 61 until the connecting end 21 gets closed to the keyboard module 40, as shown in FIG. 4(b). At this time, the portable computer 1 of the present invention is in a normal operation state as a notebook computer.

When the user continues to apply force on the free end 24 of the display module 20 to make the sliding element 61 continue to drive the connecting end 21 of the display module 20 to move forward towards the front end 11 of the base 10, the sliding element 61 gradually pushes the two connecting rods (not shown) in the present invention. The two keyboard portions of the keyboard module 40 are separated from each other and a channel is formed for the sliding element 61 to pass through the keyboard module 40. Eventually, the sliding element 61 drives the connecting end 21 of the display module 20 to move close to the front end 11 of the base 10. At this time, the display module 20 is superimposed on the base 10 and the support surface 23 of the display module 20 faces to the base 10, so that the portable computer 1 of the present invention is in a tablet operation state, as shown in FIG. 4(c).

Figure 5:
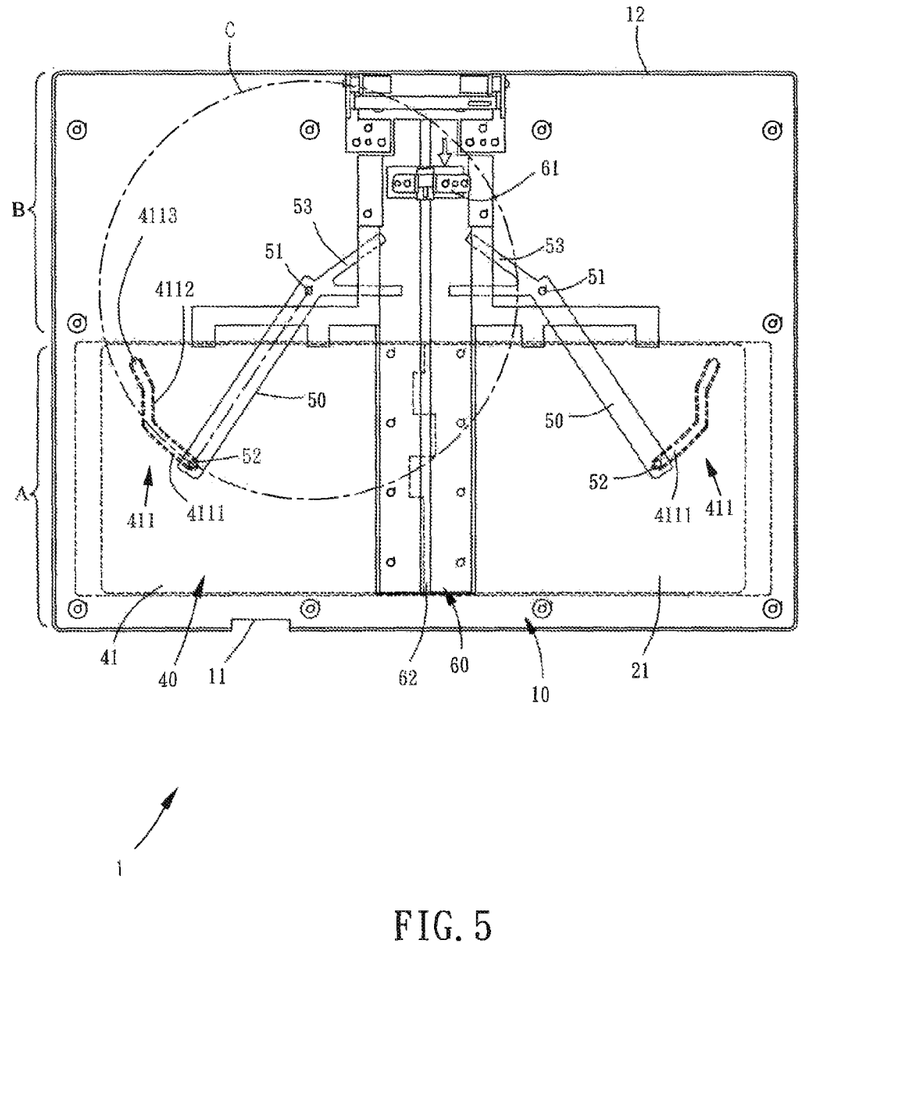
FIG. 5 is a view showing the sliding element of the portable computer of the present invention sliding towards a front end.
Figure 6:
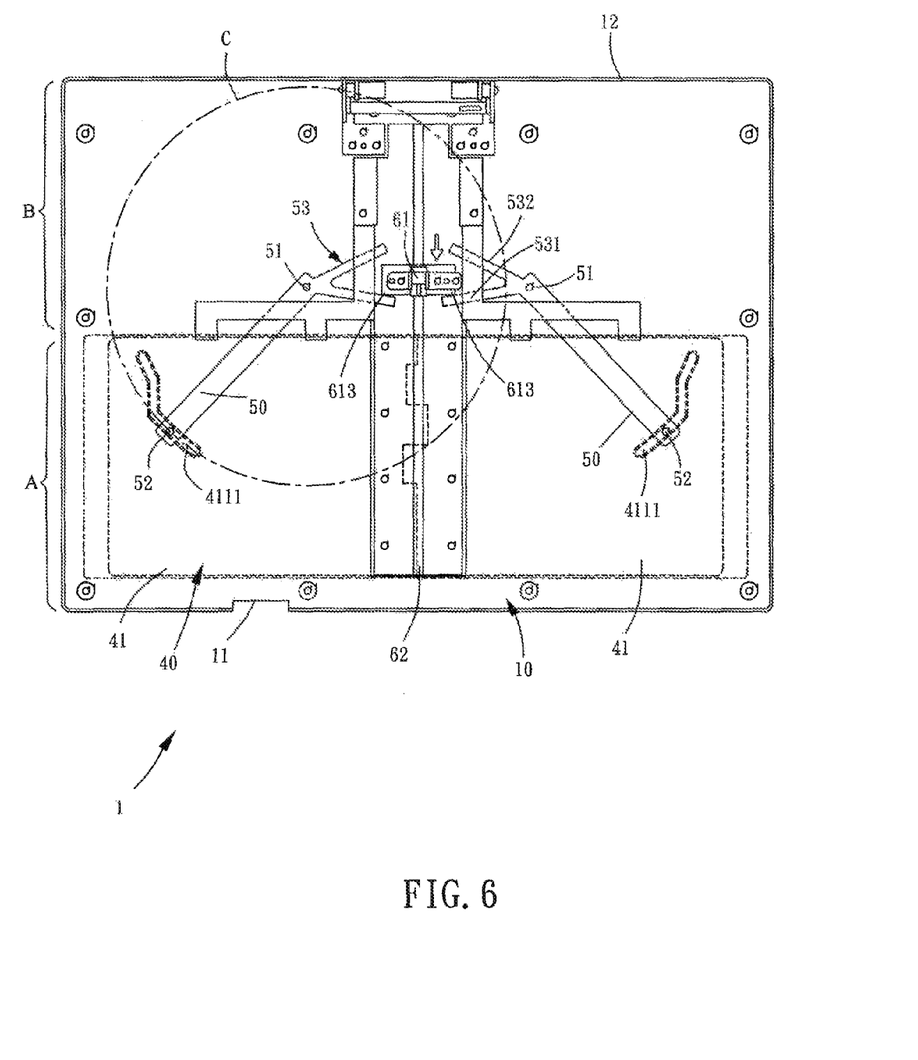
FIG. 6 is a view showing the sliding element of the portable computer of the present invention pushing the pushing element in front of a keyboard module.
Figure 7:
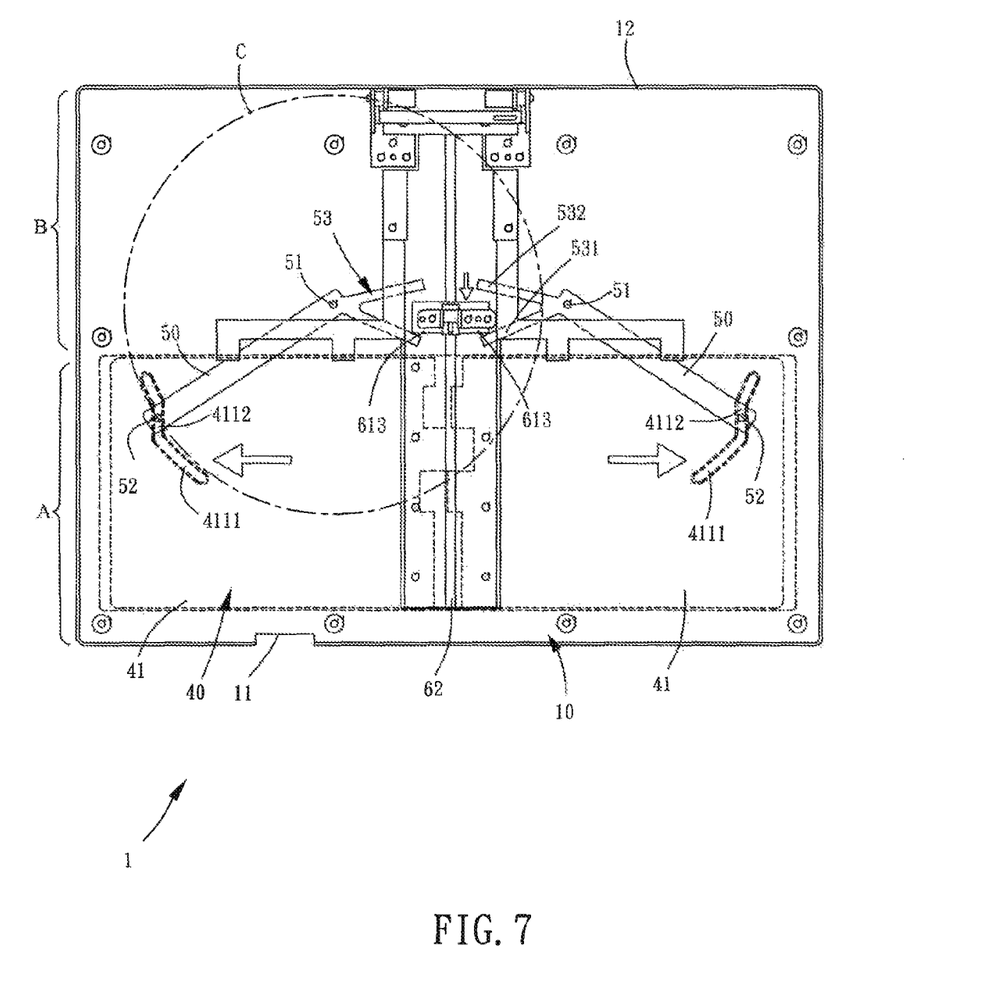
FIG. 7 is a view showing the sliding element of the portable computer of the present invention pushing the pushing element to separate the keyboard module.
Figure 8:
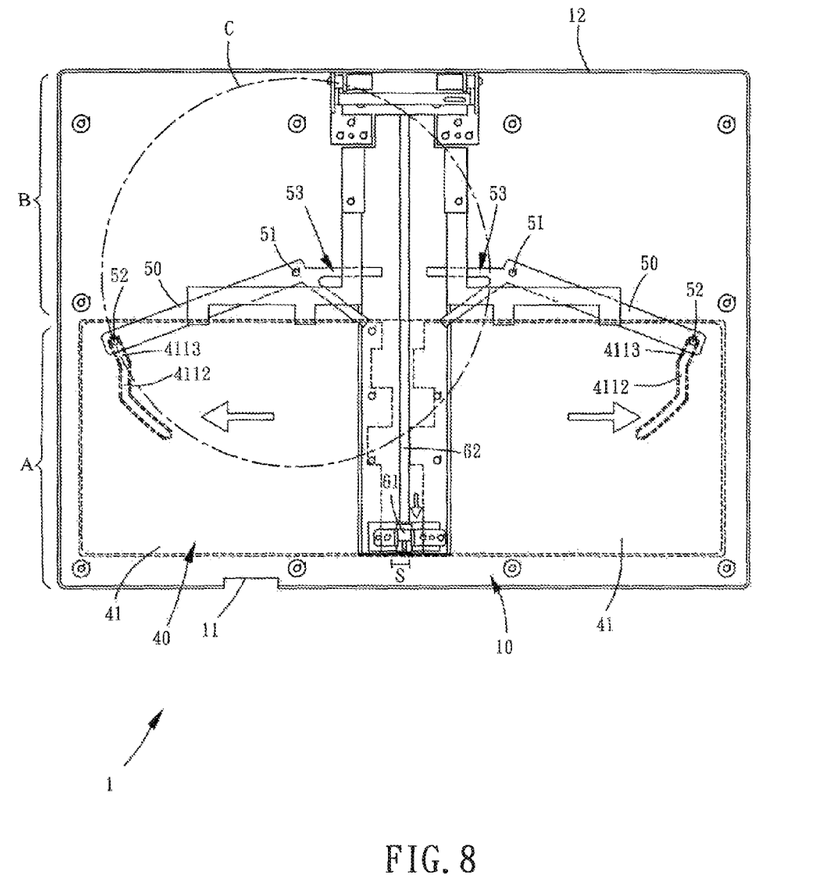
FIG. 8 is a view showing the sliding element of the portable computer of the present invention passing through the keyboard module towards the front end.

Please refer to FIG. 5 to FIG. 8. FIG. 5 is a view showing the sliding element 61 of the portable computer of the present invention sliding towards a front end 11; FIG. 6 is a view showing the sliding element 61 of the portable computer of the present invention pushing the pushing element 53 in front of a keyboard module 40; FIG. 7 is a view showing the sliding element 61 of the portable computer of the present invention pushing the pushing element 53 to separate the keyboard module 40; FIG. 8 is a view showing the sliding element 61 of the portable computer of the present invention passing through the keyboard module 40 towards the front end 11. It is noted that in order to clearly show the relationship among the keyboard module 40, the connecting rod 50 and the sliding assembly 60, components such as the display module and the support element are omitted in the figures.

As shown in FIG. 5, when the portable computer 1 of the present invention transforms the states from FIG. 4(a) to FIG. 4(b), the sliding element 61 of the sliding assembly 60 slides in the second area B along the sliding guiding structure 62 and towards the front end 11 of the base 10 with the connecting end of the display module (not shown). At this moment, the sliding element 61 does not contact with the pushing element 53 of each connecting rod 50. Each moving element 52 is moved into the arc track 4111 located near the front end 11 and the two keyboard portions 41 are kept connected to each other.

As shown in FIG. 6, when the sliding element 61 keeps sliding forward towards the front end 11 of the base 10 to get close but not yet reaching the keyboard module 40 of the first area A, the two driving elements 613 of the sliding element 61 start to contact and push the first action portion 531 of each pushing element 53, so that each connecting rod 50 rotates with the pivot portion 51 as a fulcrum and drives the moving element 52 to slide in the arc track 4111 of each track 411 near the front end 11. Because the arc track 4111 is designed as a circular arc with the pivot portion 51 as a center of a circle (corresponding to the virtual circle C in FIG. 6), when the moving element 52 slides in the arc track 4111, the two keyboard portions 41 remain fixed and are not separated even being pushed by the moving element 52.

As shown in FIG. 7, when the sliding element 61 continues to slide forward to the front of the keyboard module 40, the two driving elements 513 continue to push the first action portion 531 of each pushing element 53, so that the moving element 52 of each connecting rod 50 slides from the arc tack 4111 into the straight track 4112. At this moment, because the moving element 52 has a fixed length and is restrained by the straight track that only provides the movement substantially parallel to the moving direction of the sliding element 61, the moving element 52 generates moving substantially perpendicular to the moving direction of the sliding element 61 (shown as the arrow directions in FIG. 7) so as to drive the two keyboard portions 51 to move laterally to be separated from each other by. Until the two separated keyboard portions 21 appear with a gap S as shown in FIG. 8, the gap S allows the sliding element 61 to pass through and the sliding element 61 can continue to move forward into the first area A toward the front end 11 of the base 10 successfully along the sliding guiding structure 62.

When the two driving elements 613 of the sliding element 61 continues to push the first action portion 531 of each pushing element 53, the moving element 52 of each connecting rod 50 slides from the straight track 4112 into the arc track 4113 away the front end 11. Because each arc track 4113 is also designed as a circular arc with the pivot portion 51 as a center of a circle (also corresponding to the same virtual circle C), after the sliding element 52 slides into the arc track 4113, the two keyboard portions 41 are not pushed by the moving element 52 anymore and the gap S between the two keyboard portions is kept fixed distance. When the two driving elements 513 of the sliding element 61 leave and do not push the first action portion 531 of each pushing element 53 anymore, the sliding element 61 is able to pass through the gap S between the two separated keyboard portions 21 of the keyboard module 20 and finally reaches the front end 11 of the base 10, as shown in FIG. 8. At this moment, the display module is superimposed on the base 10 and the support face faces to the base 10, so that the portable computer 1 is presented as the tablet operation state as shown in FIG. 4(c).

In contrary, when the user wants to transform the portable computer 1 from the tablet operation state of FIG. 4(c) back to the normal operation state of FIG. 4(b), he or she applies an opposite force to the free end of the display module. At this time, the sliding element 61 of the sliding assembly 60 slides along the sliding guiding structure 62 to pass through the gap S between the two keyboard portions 41 toward the rear end 12 from the front end 11 of the base.

Figure 9:
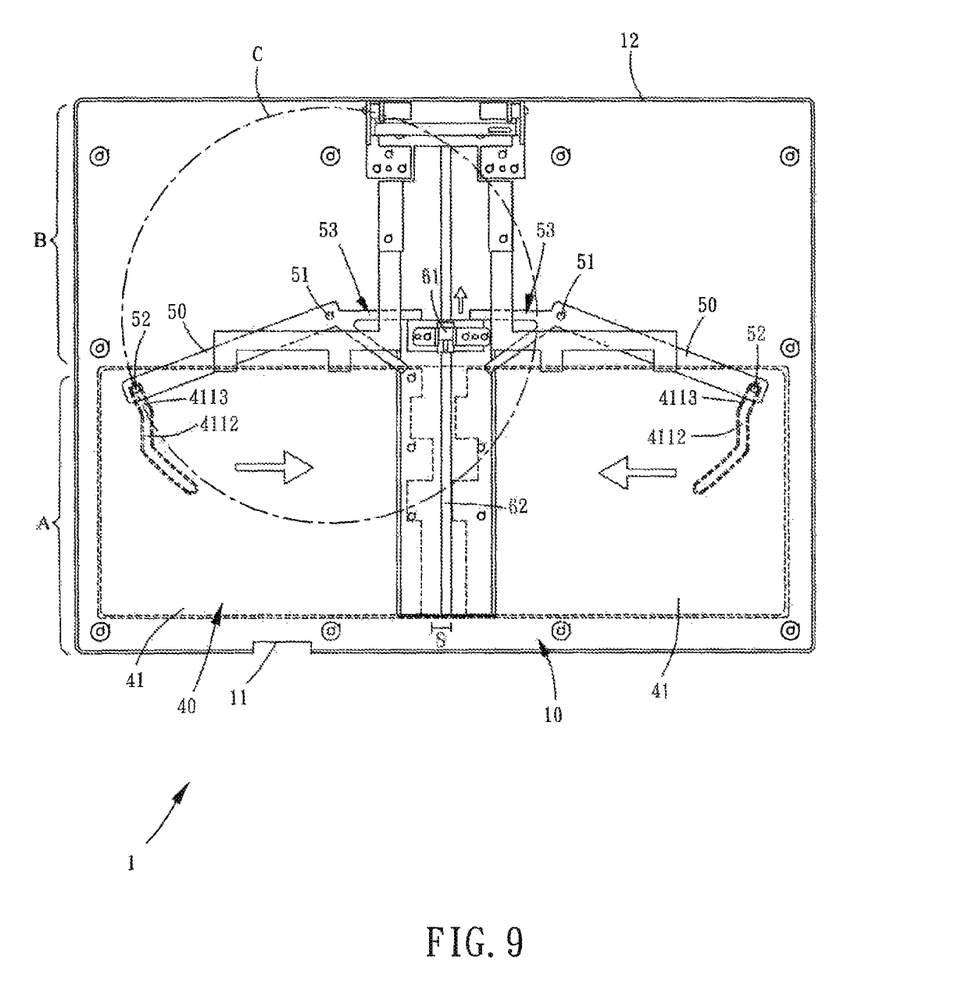
FIG. 9 is a view showing the sliding element of the portable computer of the present invention pushing the pushing element towards a rear end to combine the keyboard module.
Figure 10:
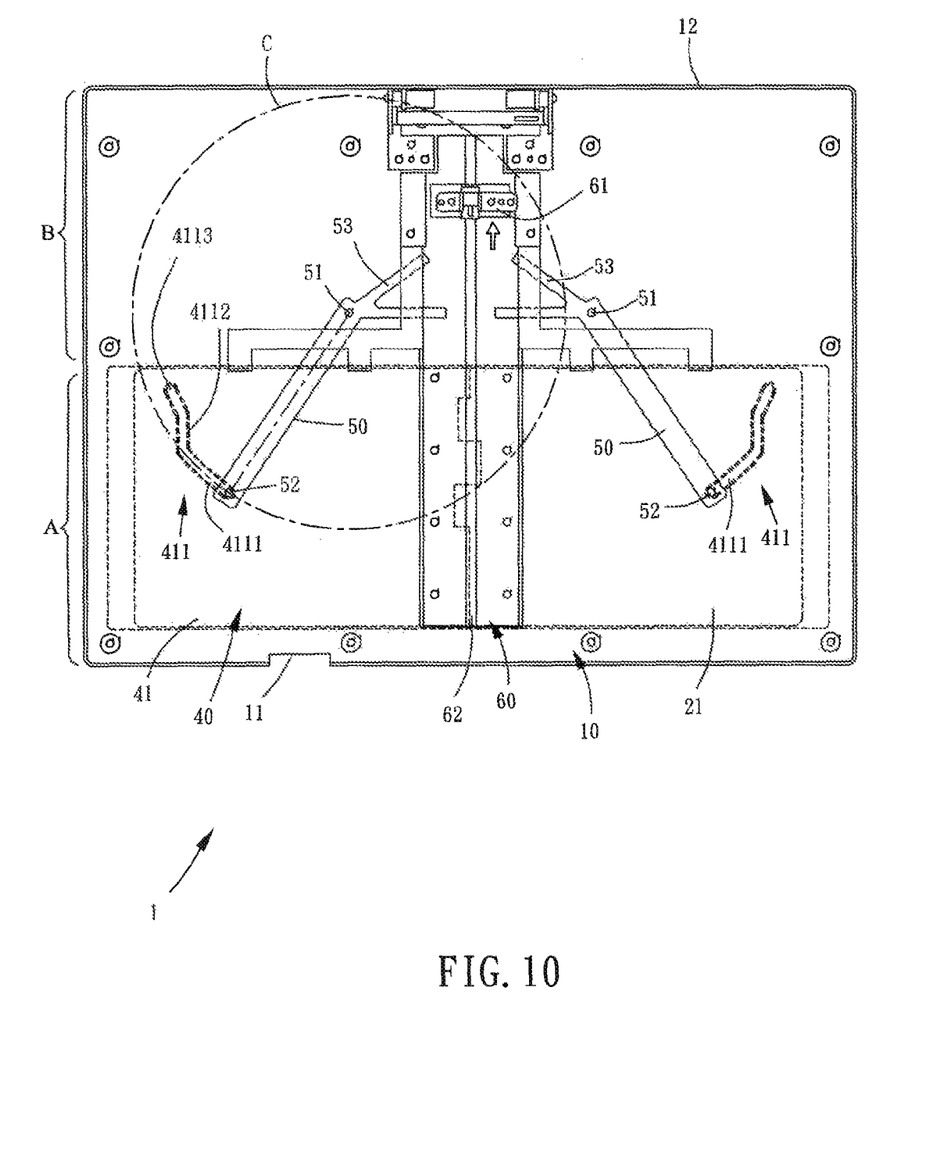
FIG. 10 is a view showing the sliding element of the portable computer of the present invention sliding towards the rear end to leave the pushing element.

Please refer to both FIG. 9 and FIG. 10. FIG. 9 is a view showing the sliding element 61 of the portable computer of the present invention pushing the pushing element 53 towards a rear end 12 to combine the keyboard module 40; FIG. 10 is a view showing the sliding element 61 of the portable computer of the present invention sliding towards the rear end 12 to leave the pushing element 53. It is noted that in order to clearly show the relationship among the keyboard module 40, the connecting rod 50 and the sliding assembly 60, the components such as the display module and the support element are omitted in the figures.

As shown in FIG. 9, when the sliding element 61 passes through the keyboard module 40 and leaves the first area A, the two driving elements 613 of the sliding element 61 start to contact with and push the second actuation portion 532 of each pushing element 53, so that each connecting rod 50 rotates with the pivot portion 51 as a fulcrum to drive the two moving elements 52 to slide from the arc track 4113 away from the front end 12 into the straight track 4112. At this time, the moving element 52 generates the movement substantially perpendicular to the moving direction of the sliding element 61 and further drives the two keyboard portions 21 to move laterally and to get closer until being combined (shown as the arrow directions in FIG. 9). After the two keyboard portions 41 are combined, each moving element 52 slide from the straight track 4112 into the arc track 4111 near the front end 11. At this moment, the two keyboard portions 41 are not pushed. Finally, after the two driving elements 613 of the sliding element 61 leave and stop pushing the second action portion 532 of each pushing element 53, the sliding element 61 returns to the second area B that is near the rear end 12 of the base 10, as shown in FIG. 10. Then, the portable computer 1 of the present invention returns to the closed status of FIG. 4(a).

With the design mentioned above, when the user flips the display module 20 relative to the base 10 and makes the connecting end 21 to be close to the keyboard module 40, the keyboard module 40 is driven to be separated automatically and the sliding element 61 drives the display module 20 to pass through the keyboard module 40 directly; then the display module 20 is superimposed on the base 10 and the display surface outwardly to show the tablet operation state. When it is operated conversely, the keyboard module 40 is also driven automatically to be combined to return to its original state. Therefore, it avoids the problem of the traditional design that connects one sliding element in each of two sides of the display module to consider symmetric balance of the two-sides structure during flipping and moving. Besides, the disposal of sliding components can be decreased and increase reliability and utility of sliding components for movement.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally the above disclosure is not intended to limit the present invention. The scope of the present invention is defined by the appended claims.

What is claimed is:

1. A portable computer, comprising:
   a base comprising a front end and a rear end, a first area being defined on a front side and a second area being defined on a rear side between the front end and the rear end;
   a display module comprising a connecting end and a support surface;
   at least one support element, each of the support element comprising a first fixed end and a second fixed end, the first fixed end being pivotally connected to the support surface of the display module for allowing the display module to rotate relative to the support element, and the second fixed end being pivotally connected to or close to the rear end for allowing the support element to rotate relative to the base;

a sliding assembly, comprising a sliding element and a sliding guiding structure, the sliding guiding structure being disposed in the base, and the sliding element being combined with the connecting end of the display module and able to slide along the sliding guiding structure;

two connecting rods, each of the connecting rods comprising a pivot portion, a moving element and a pushing element, each of the connecting rods being combined with the base and rotated with the pivot portion as a fulcrum, and the pivot portion being disposed between the moving element and the pushing element; and a keyboard module comprising two separable keyboard portions, each of the keyboard portions being movably combined with the first area of the base, and each of the keyboard portion comprising a track, the moving element of each of the connecting rods sliding along the track of each of the keyboard portions so as to drive each of the keyboard portions to move relative to the base;

whereby when the display module is pushed to move the sliding element connected to the connecting end along the sliding guiding structure from the second area to the first area, the sliding element pushes against the pushing element of the connecting rod so that the connecting rod rotates with the pivot portion as the fulcrum, and drives the moving element to slide along the track so as to push the two keyboard portions to be separated from each other with a gap, which allows the sliding element to enter the first area and to continuously pass through the keyboard module.

2. The portable computer as claimed in claim 1, wherein the track comprises a straight track and at least one arc track, the straight track is disposed substantially parallel to a sliding direction of the sliding element, and each of the arc tracks has a track path as a circular arc with respect to the pivot portion as a center of a circle.

3. The portable computer as claimed in claim 2, wherein the at least one arc track comprises two arc tracks, and two ends of the straight track are respectively connected to the different arc tracks; the different arc tracks corresponding to different circular arcs with different diameters.

4. The portable computer as claimed in claim 2, wherein when the moving element slides along the arc track of the track, the two keyboard portions are kept fixed; when the moving element slides along the straight track of the track, the two keyboard portions are pushed to move by the moving element.

5. The portable computer as claimed in claim 1, wherein the pushing element comprises a first action portion and a second action portion; the sliding element pushes the first action part during the sliding element slides towards the front end, and the sliding element pushes the second action part during the sliding element slides towards the rear end.

6. The portable computer as claimed in claim 5, wherein there is an angle between the first action part and the second action part.

7. The portable computer as claimed in claim 6, wherein the pushing element is a V-shaped lever.

8. The portable computer as claimed in claim 1, wherein the sliding element comprises two driving elements disposed in two sides of the sliding element for pushing each pushing element of the two connecting rods correspondingly.

9. The portable computer as claimed in claim 1, wherein the base further comprises a plurality of restraint elements, and each of the keyboard portions further comprises at least one restraint hole; each of the keyboard portions is movably fixed to the base by the plurality of the constraint elements cooperated with each of the restraint holes.

10. The portable computer as claimed in claim 1, wherein the sliding guiding structure is a sliding track, and the sliding element is a sliding block disposed in the sliding track for sliding along the sliding track.

11. The portable computer as claimed in claim 1, wherein the sliding guiding structure is a rod element, and the sliding element is a sleeve element combined with the rod element for sliding along with the rod element.

* * * * *